United States Patent
Mathis

[19]

[11] Patent Number: 6,095,476
[45] Date of Patent: Aug. 1, 2000

[54] ADJUSTABLE TELEVISION STAND

[76] Inventor: Virgil Mathis, 1642 W. Maypole, Chicago, Ill. 60612

[21] Appl. No.: 09/022,358

[22] Filed: Feb. 12, 1998

[51] Int. Cl.[7] .................................................. F16M 13/00
[52] U.S. Cl. ...................... 248/422; 248/415; 248/371; 248/551; 248/922; 108/7; 74/89.15; 74/495; 74/89.18
[58] Field of Search ................................. 248/422, 415, 248/405, 278.1, 279.1, 910, 530, 149, 371, 395, 397, 922, 921, 923; 74/89.15, 495, 89.18, 10 A; 108/6, 7, 147; 297/DIG. 8

[56] References Cited

U.S. PATENT DOCUMENTS

| | | | |
|---|---|---|---|
| 2,890,010 | 6/1959 | Barkheimer | 248/422 |
| 3,774,872 | 11/1973 | Morelli | 248/11 |
| 4,585,197 | 4/1986 | Liautaud | 248/349 |
| 4,697,778 | 10/1987 | Harashima | 248/415 |
| 4,946,127 | 8/1990 | Kulaga | 248/551 |
| 4,959,645 | 9/1990 | Balz | 340/825.72 |
| 4,964,606 | 10/1990 | Beam et al. | 248/333 |
| 5,124,805 | 6/1992 | Chung | 358/248 |
| 5,400,993 | 3/1995 | Hamilton | 248/919 |
| 5,501,420 | 3/1996 | Watt et al. | 248/280.11 |
| 5,634,622 | 6/1997 | Pye | 248/371 |

*Primary Examiner*—Anita M. King
*Assistant Examiner*—Gwendolyn Baxter

[57] ABSTRACT

An adjustable television stand is provided including a base fixedly positioned on a recipient surface. Also included is an intermediate portion slidably situated on the base along a vertical axis. An upper support is rotatably coupled to the intermediate portion about a vertical axis and further tiltable about a horizontal axis. A plurality of mechanisms are provided for selectively raising and lowering the intermediate portion and further rotating and tilting the upper support.

1 Claim, 5 Drawing Sheets

ADJUSTABLE TELEVISION STAND

BACKGROUND OF THE INVENTION

1. Field of the Invention

The present invention relates to television stands and more particularly pertains to a new adjustable television stand for allowing the selective positioning of a television set.

2. Description of the Prior Art

The use of television stands is known in the prior art. More specifically, television stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art television stands include U.S. Pat. No. 4,566,663; U.S. Pat. No. 5,331,413; U.S. Pat. No. 5,220,848; U.S. Pat. No. 5,124,805; U.S. Pat. No. 4,706,920; and U.S. Pat. Des. 320,126.

In these respects, the adjustable television stand according to the present invention substantially departs from the conventional concepts and designs of the prior art, and in so doing provides an apparatus primarily developed for the purpose of allowing the selective positioning of a television set.

SUMMARY OF THE INVENTION

In view of the foregoing disadvantages inherent in the known types of television stands now present in the prior art, the present invention provides a new adjustable television stand construction wherein the same can be utilized for allowing the selective positioning of a television set.

The general purpose of the present invention, which will be described subsequently in greater detail, is to provide a new adjustable television stand apparatus and method which has many of the advantages of the television stands mentioned heretofore and many novel features that result in a new adjustable television stand which is not anticipated, rendered obvious, suggested, or even implied by any of the prior art television stands, either alone or in any combination thereof.

To attain this, the present invention generally comprises a hollow base having a weighted bottom face, an upstanding side wall, and a top face. The top face has an annular slit formed therein. Such slit requires a circular central portion of the top face to be supported via an L-shaped support mounted within an interior space of the base. Also included is an intermediate portion having a vertically oriented hollow cylindrical configuration. As shown in FIG. 3, the intermediate portion is slidably situated within the annular slit formed in the top face of the base. The intermediate portion also has a horizontal circular divider mounted therein adjacent to an open top thereof. Next provided is an upper support including a top plate having a planar square configuration. A stop is formed along a front edge of the top plate. A rigid bracket is mounted between side edges of the top plate for encompassing a television mounted on the top plate. The upper support includes a post having a top end pivotally coupled about a horizontal axis to the top plate. A bottom end of the post is rotatably coupled about a vertical axis to a top face of the divider of the intermediate portion. A hollow hemispherical portion is mounted to a bottom surface of the top plate. As shown in FIG. 3, the hollow hemispherical portion slidably abuts an upper peripheral edge of the open top of the intermediate portion. FIGS. 3 & 4 best show a riser mechanism including a vertically oriented ball screw. The ball screw has a top end rotatably mounted to the divider of the intermediate portion. A bottom end of the ball screw remains in screwable engagement within a ball nut. Such ball nut is in turn rotatably coupled to the central portion of the base. The ball nut has a periphery with a plurality of teeth for engaging a gear of a first motor mounted within the base. The first motor is adapted for selectively raising and lowering the intermediate portion and upper support. Also included is a rotator mechanism including a gear fixedly coupled in concentric relationship with a bottom of the post. Such gear serves for engaging a gear of a second motor mounted on the divider of the intermediate portion. By this interconnection, the second motor is capable of selectively rotating the upper support about a vertical axis. Next included is a tilt mechanism including a portion of a gear mounted to a bottom surface of the top plate of the upper support. A center of the portion of the gear remains in alignment with the horizontal axis associated with the pivotal coupling between the post and the upper support. The tilt mechanism further includes a third motor mounted on the post. Such motor is equipped with a gear for engaging the portion of the gear thereby selectively tilting the upper support about a horizontal axis.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable television stand apparatus and method which has many of the advantages of the television stands mentioned heretofore and many novel features that result in a new adjustable television stand which is not anticipated, rendered obvious, suggested, or even implied by any of the prior art television stands, either alone or in any combination thereof.

It is another object of the present invention to provide a new adjustable television stand which may be easily and efficiently manufactured and marketed.

It is a further object of the present invention to provide a new adjustable television stand which is of a durable and reliable construction.

An even further object of the present invention is to provide a new adjustable television stand which is susceptible of a low cost of manufacture with regard to both materials and labor, and which accordingly is then susceptible of low prices of sale to the consuming public, thereby making such adjustable television stand economically available to the buying public.

Still yet another object of the present invention is to provide a new adjustable television stand which provides in the apparatuses and methods of the prior art some of the advantages thereof, while simultaneously overcoming some of the disadvantages normally associated therewith.

Still another object of the present invention is to provide a new adjustable television stand for allowing the selective positioning of a television set.

Even still another object of the present invention is to provide a new adjustable television stand that includes a base fixedly positioned on a recipient surface. Also included is an intermediate portion slidably situated on the base along a vertical axis. An upper support is rotatably coupled to the intermediate portion about a vertical axis and further tiltable about a horizontal axis. A plurality of mechanisms are provided for selectively raising and lowering the intermediate portion and further rotating and tilting the upper support.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
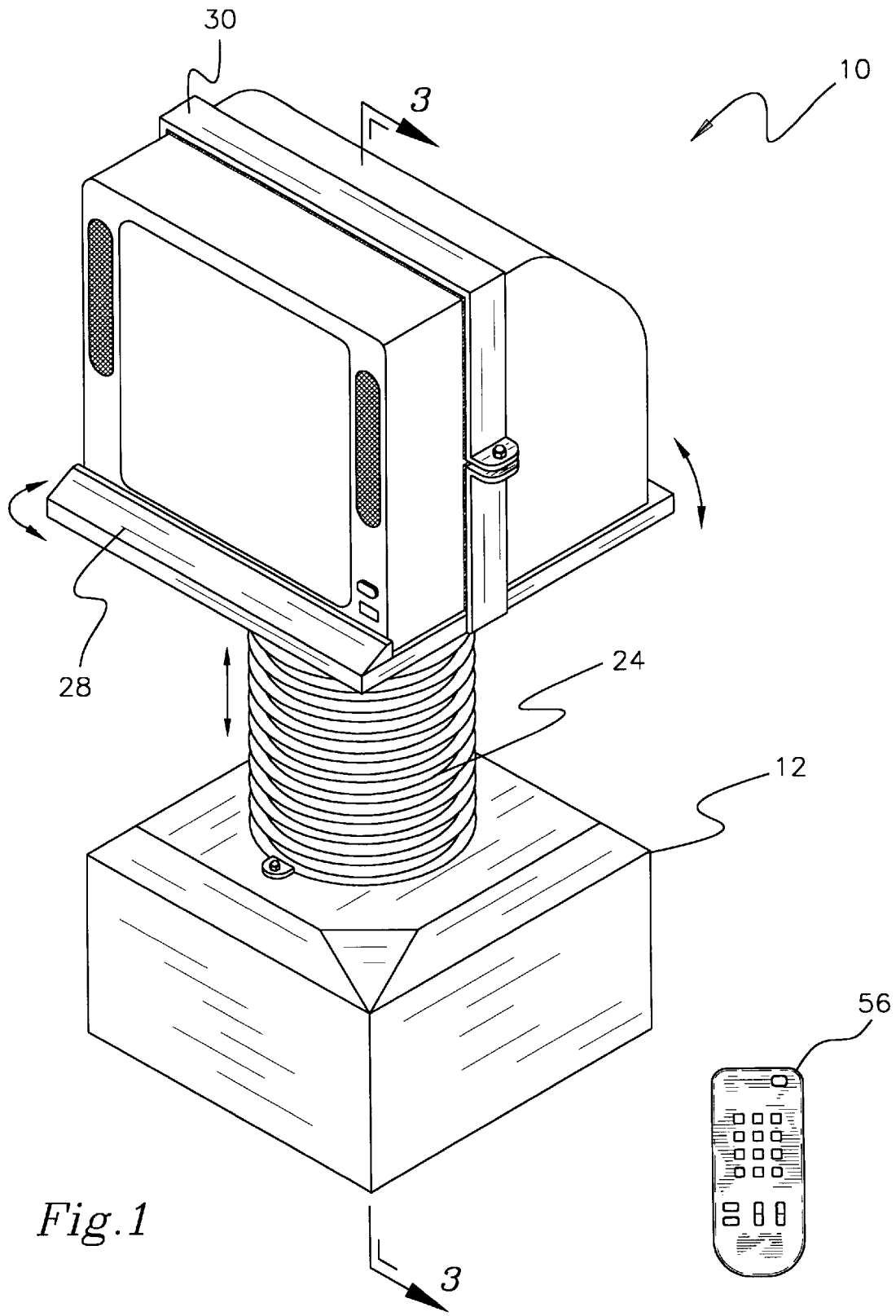
FIG. 1 is a perspective view of a new adjustable television stand according to the present invention.
FIG. 2 is a front view of the remote control of the present invention.

With reference now to the drawings, and in particular to FIGS. 1 through 8 thereof, a new adjustable television stand embodying the principles and concepts of the present invention and generally designated by the reference numeral 10 will be described.

The present invention, designated as numeral 10, includes a hollow rectangular base 12 having a weighted bottom face, an upstanding side wall, and a top face. The top face has an annular slit 14 formed therein. Such slit requires a circular central portion of the top face to be supported via an L-shaped support 16 mounted within an interior space of the base.

Figure 3:
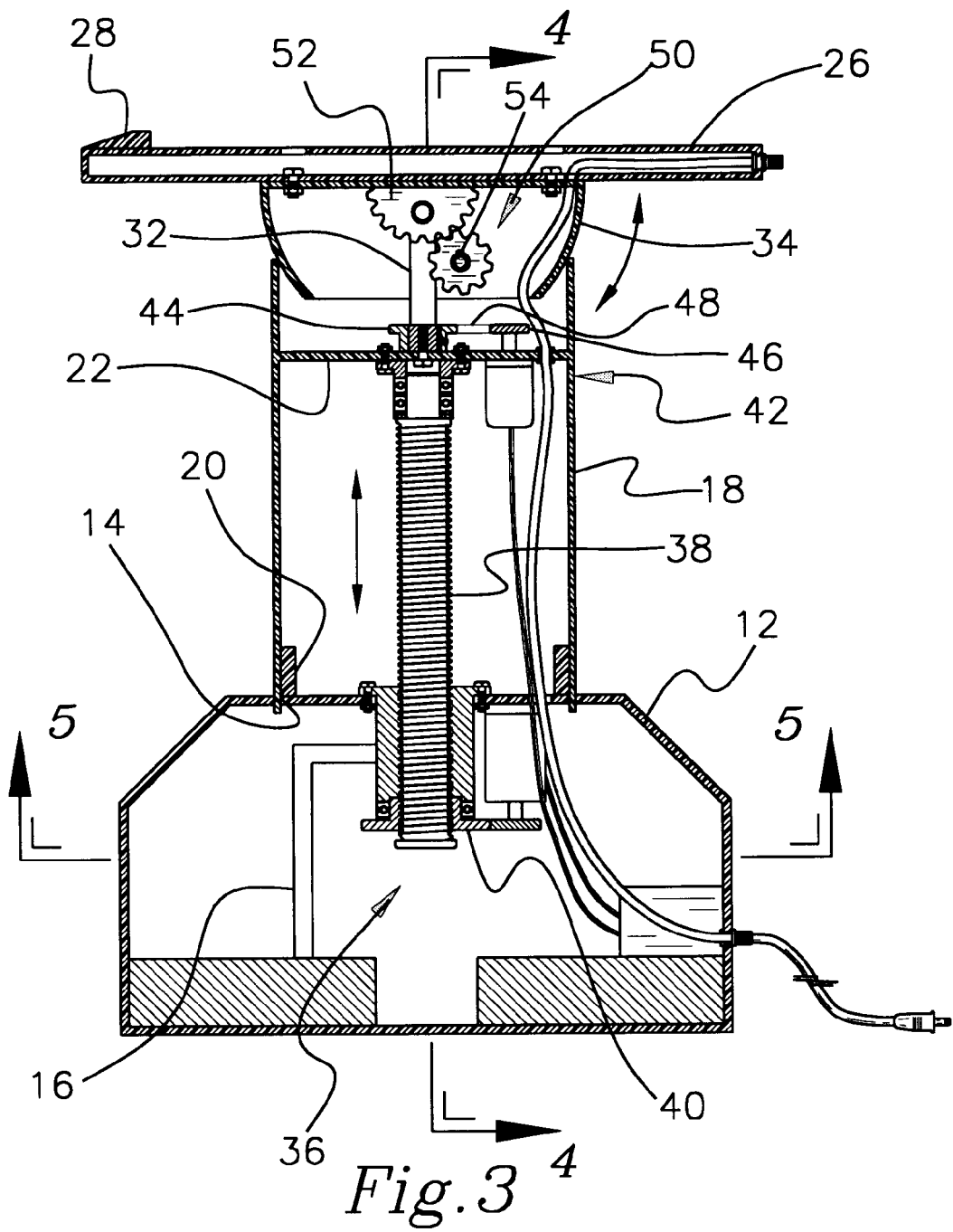
FIG. 3 is a cross-sectional view of the present invention taken along line 3—3 shown in FIG. 1.

Also included is an intermediate portion 18 having a vertically oriented hollow cylindrical configuration. As shown in FIG. 3, the intermediate portion is slidably situated within the annular slit formed in the top face of the base. An annular guide 20 is mounted to the top face of the base and abuts an interior surface of the intermediate portion for guiding the same. Note FIG. 3. The intermediate portion also has a horizontal circular divider 22 mounted therein adjacent to an open top thereof.

Next provided is an upper support 26 including a top plate having a planar square configuration and a size approximately equal to the top face of the base. A stop 28 is formed along a front edge of the top plate. A padded rigid bracket 30 is mounted between side edges of the top plate for encompassing a television mounted on the top plate. As shown in the Figures, the bracket includes a pair of U-shaped portions a bottom one of which is mounted to the support plate and a top one of which is coupleable to the bottom one via a pair of bolts.

The upper support further includes a central post 32 having a top end pivotally coupled about a horizontal axis to the top plate. A bottom end of the post is rotatably coupled about a vertical axis to a top face of the divider of the intermediate portion. A hollow hemispherical portion 34 is mounted to a bottom surface of the top plate. As shown in FIG. 3, the hollow hemispherical portion slidably abuts an upper peripheral edge of the open top of the intermediate portion.

As shown in FIG. 1, a bellowed sleeve 24 is preferably coupled at a top end thereof to a bottom surface of the top plate and at a bottom end thereof to the top face of the base. It is mandatory that the top end be rotatably coupled to the top plate via an O-ring sleeve or the like to accommodate the rotation of the upper support. In an alternate embodiment, a magnet or other release mechanism may be used to allow the sleeve to simply disconnect from the support plate when the support plate tilts or rotates. The sleeve functions to protect fingers of a user in operation.

Figure 4:
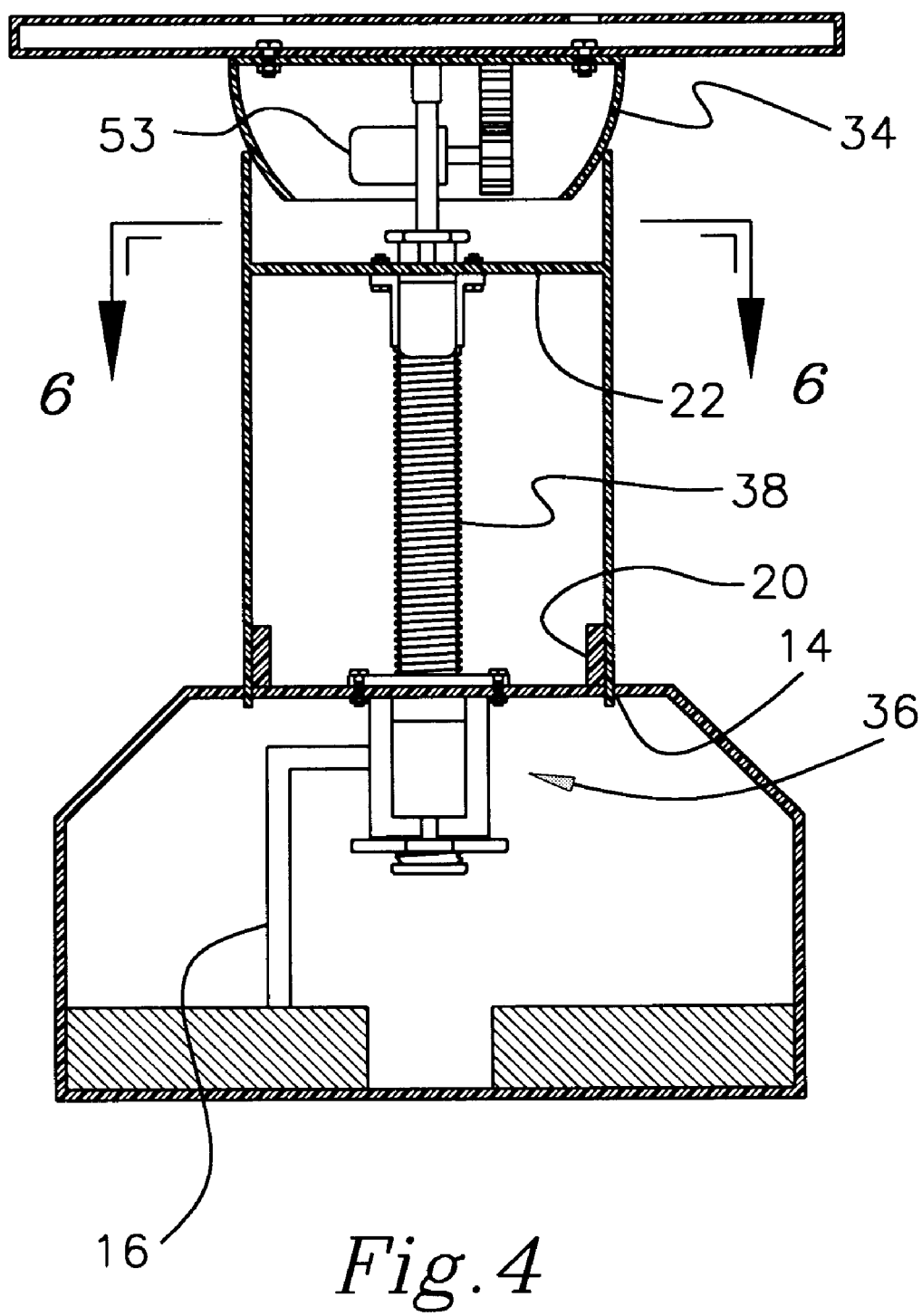
FIG. 4 is a cross-sectional view of the present invention taken along line 4—4 shown in FIG. 3.
Figure 5:
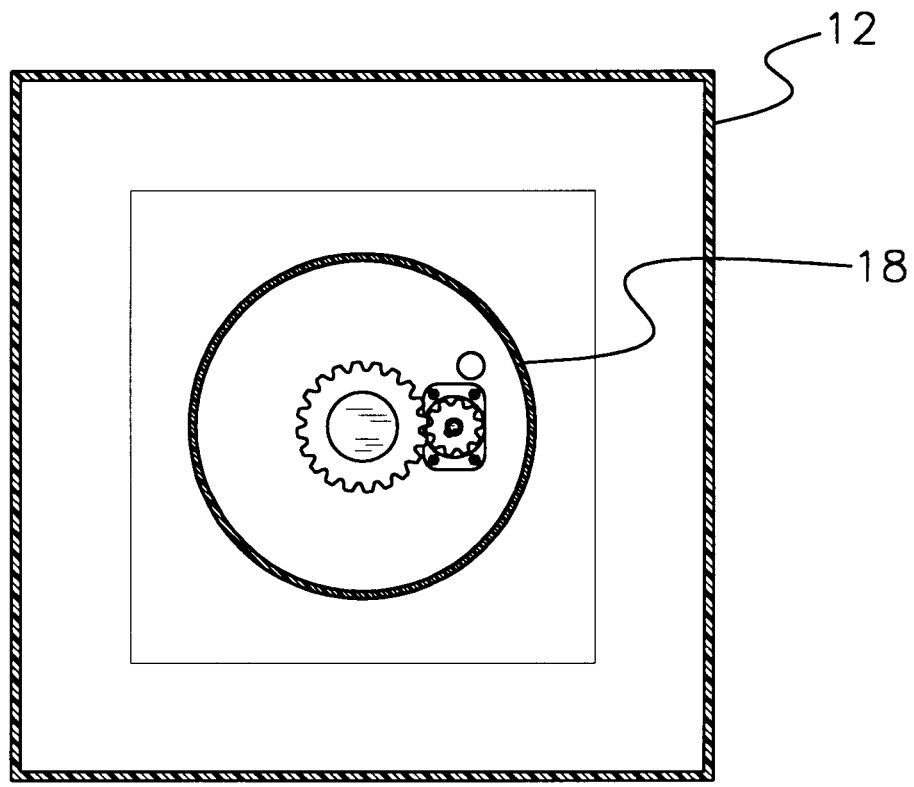
FIG. 5 is a cross-sectional view of the present invention taken along line 5—5 shown in FIG. 3.
Figure 6:
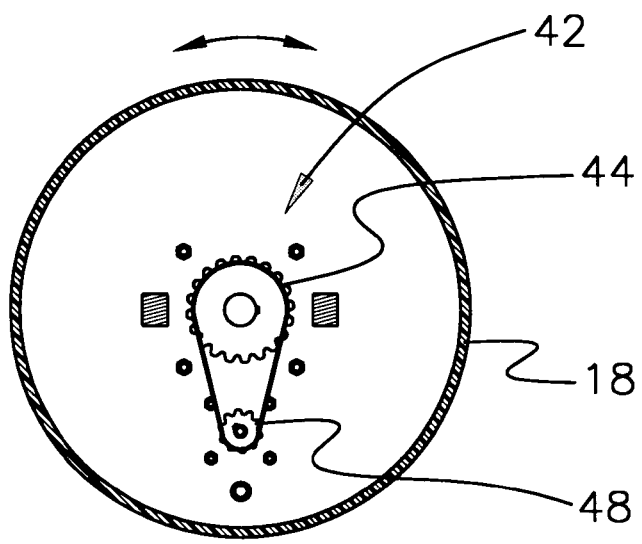
FIG. 6 is a cross-sectional view of the present invention taken along line 6—6 shown in FIG. 4.
Figure 7:
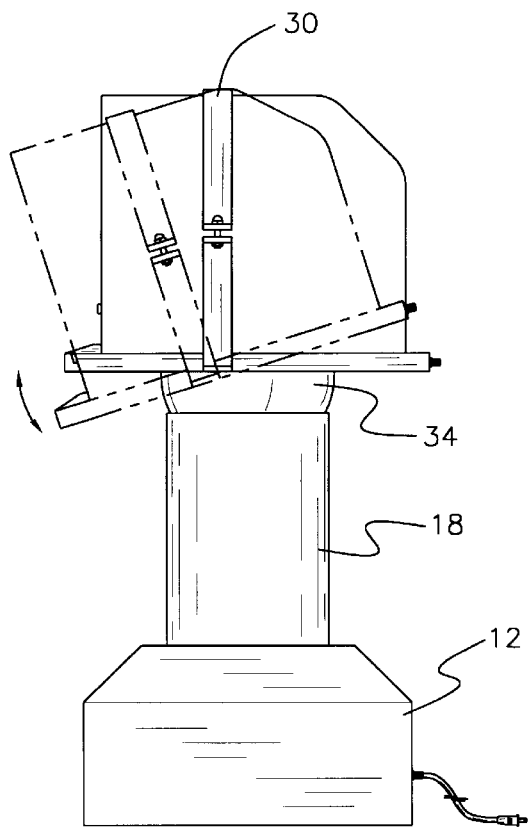
FIG. 7 is a side view of the present invention in use.
Figure 8:
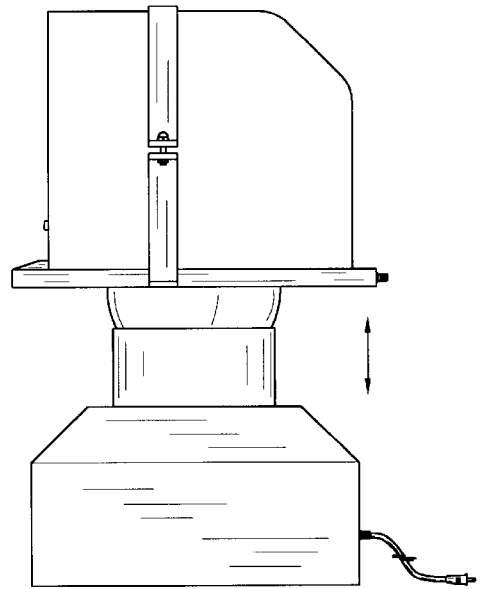
FIG. 8 is another side view of the present invention in use.

FIGS. 3 & 4 best show a riser mechanism 36 including a vertically oriented ball screw 38. The ball screw has a top end rotatably mounted to the divider of the intermediate portion. A bottom end of the ball screw remains in screwable engagement within a ball nut 40. Such ball nut is in turn rotatably coupled to the central portion of the top face of the base in a fixed horizontal plane. The ball nut has a periphery with a plurality of teeth for engaging a gear of a first motor mounted within the base. The first motor is adapted for selectively raising and lowering the intermediate portion and upper support.

Also included is a rotator mechanism 42 including a gear 44 fixedly coupled in concentric relationship with a bottom of the post of the upper support. Such gear serves for engaging a gear 46 of a second motor mounted on the divider of the intermediate portion via a belt 48. By this interconnection, the second motor is capable of selectively rotating the upper support about a vertical axis.

Next included is a tilt mechanism 50 including a portion of a gear 52 mounted to a bottom surface of the top plate of the upper support. A center of the portion of the gear remains in alignment with the horizontal axis associated with the pivotal coupling between the post and the upper support. The tilt mechanism further includes a third motor mounted on the post. Such motor is equipped with a gear 54 for engaging the portion of the gear thereby selectively tilting the upper support about the horizontal axis.

As shown in FIG. 3, a pair of cables are provided each having a first adapter end mounted to the side wall of the base and a second adapter end mounted to a rear edge of the top plate of the upper support. An intermediate portion of each cable extends through holes formed in both the divider and top face of the base. Further, the cables are run through a hollow interior of the top plate. The cables function for providing both power and cable TV outlets at the rear edge of the top plate of the upper support for convenient access.

It should be noted that the support plate of the present invention may be sized to accommodate televisions of any size. Further, the motorized mechanisms may be replaced with hydraulics for the purpose of maneuvering the various components of the present invention.

As an option, a hand held infrared remote control 56 may be employed to a send signals to a receiver in the base. Such receiver is in turn adapted to control the motors in such a way that a user may orient the television in a desired manner simply by depressing three toggle switches on the remote control. Note FIG. 2. Further options include an anti-theft alarm system and recesses formed in the side wall of the base for housing a VCR or the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable television stand comprising, in combination:

a hollow base including a weighted bottom face, an upstanding side wall, and a top face, the top face having an annular slit formed therein thereby requiring a circular central portion of the top face to be supported via an L-shaped support mounted within an interior space of the base;

an intermediate portion having a vertically oriented hollow cylindrical configuration slidably situated within the annular slit formed in the top face of the base, the intermediate portion having a horizontal circular divider mounted therein adjacent to an open top thereof;

an upper support including a top plate having a planar square configuration with a stop formed along a front edge thereof and a rigid bracket mounted between side edges of the top plate for encompassing a television mounted on the top plate, the upper support including a post having a top end pivotally coupled about a horizontal axis to the top plate the post having a bottom end rotatably coupled about a vertical axis to a top face of the divider of the intermediate portion, and a hollow hemispherical portion mounted to a bottom surface of the top plate and slidably abutting an upper peripheral edge of the open top of the intermediate portion;

a riser mechanism including a vertically oriented ball screw having a top end rotatably mounted to the divider of the intermediate portion and a bottom end in screwable engagement within a ball nut which is in turn rotatably coupled to the central portion of the base, the ball nut having a periphery with a plurality of teeth for engaging a gear of a first motor mounted within the base for selectively raising and lowering the intermediate portion and upper support;

a rotator mechanism including a gear fixedly coupled in concentric relationship with a bottom of the post for engaging a gear of a second motor mounted on the divider of the intermediate portion for the purpose of selectively rotating the upper support about a vertical axis; and a tilt mechanism including a portion of a gear mounted to a bottom surface of the top plate of the upper support with a center thereof in alignment with the horizontal axis associated with the pivotal coupling between the post and the upper support, the tilt mechanism further including a third motor mounted on the post with a gear for engaging the portion of the gear thereby selectively tilting the upper support about a horizontal axis.

* * * * *